US008457967B2

(12) United States Patent
Audhkhasi et al.

(10) Patent No.: US 8,457,967 B2
(45) Date of Patent: Jun. 4, 2013

(54) AUTOMATIC EVALUATION OF SPOKEN FLUENCY

(75) Inventors: Kartik Audhkhasi, Los Angeles, CA (US); Om D. Deshmukh, New Delhi (IN); Kundan Kandhway, New Delhi (IN); Ashish Verma, New Delhi (IN)

(73) Assignee: Nuance Communications, Inc., Burlington, MA (US)

( * ) Notice: Subject to any disclaimer, the term of this patent is extended or adjusted under 35 U.S.C. 154(b) by 963 days.

(21) Appl. No.: 12/541,927

(22) Filed: Aug. 15, 2009

(65) Prior Publication Data

US 2011/0040554 A1 Feb. 17, 2011

(51) Int. Cl.

*G10L 15/04* (2006.01)
*G10L 15/26* (2006.01)
*G10L 15/06* (2006.01)
*G10L 13/00* (2006.01)
*G10L 21/00* (2006.01)
*G06F 17/27* (2006.01)

(52) U.S. Cl.

USPC ........... 704/254; 704/235; 704/243; 704/251; 704/258; 704/270; 704/270.1; 704/275; 704/9; 704/10

(58) Field of Classification Search

USPC ............. 704/235, 243, 258, 270, 270.1, 275, 704/254, 251, 9, 10; 434/178, 169, 185, 187, 434/156

See application file for complete search history.

(56) References Cited

U.S. PATENT DOCUMENTS 6,157,913 A * 12/2000 Bernstein ...................... 704/275
6,305,942 B1 * 10/2001 Block et al. ................... 434/156
6,754,626 B2 * 6/2004 Epstein ......................... 704/235
7,031,922 B1 4/2006 Kalinowski
7,324,944 B2 * 1/2008 Hansen et al. ................ 704/270
7,457,752 B2 11/2008 Oudeyer
7,873,522 B2 * 1/2011 Du et al. ....................... 704/275
2002/0010575 A1 * 1/2002 Haase et al. .................. 704/205
2004/0049391 A1 3/2004 Polanyi
2004/0067472 A1 * 4/2004 Polanyi et al. ................ 434/178
2004/0193409 A1 9/2004 Hansen
2006/0074655 A1 * 4/2006 Bejar et al. .................... 704/243
2007/0213982 A1 * 9/2007 Xi et al. ........................ 704/243
2008/0249773 A1 * 10/2008 Bejar et al. .................... 704/243

FOREIGN PATENT DOCUMENTS

WO WO 00/30059 A1 5/2000
WO WO 2006/136061 A1 12/2006

OTHER PUBLICATIONS

Kim, Joungbum, "Automatic Detection of Sentence Boundaries, Disfluencies, and Conversational Fillers in Spontaneous Speech", 2004, Graduate School-Master Theses, University of Washington, pp. 1-85.*

(Continued)

*Primary Examiner* — Edgar Guerra-Erazo
(74) *Attorney, Agent, or Firm* — Wolf, Greenfield & Sacks, P.C.

(57) ABSTRACT

A procedure to automatically evaluate the spoken fluency of a speaker by prompting the speaker to talk on a given topic, recording the speaker's speech to get a recorded sample of speech, and then analyzing the patterns of disfluencies in the speech to compute a numerical score to quantify the spoken fluency skills of the speakers. The numerical fluency score accounts for various prosodic and lexical features, including formant-based filled-pause detection, closely-occurring exact and inexact repeat N-grams, normalized average distance between consecutive occurrences of N-grams. The lexical features and prosodic features are combined to classify the speaker with a C-class classification and develop a rating for the speaker.

20 Claims, 4 Drawing Sheets

OTHER PUBLICATIONS

Zhang, Qi et al., "Exploring Features for Identifying Edited Regions in Disfluent Sentences", Proc. International Workshop on Parsing Technologies (IWPT), Oct. 9, 2005, pp. 179-185.*

Spilker, Jorg et al., "Detection and Correction of Speech Repairs in Word Lattices", Proc Eurospeech, vol. 5, Sep. 1997, pp. 1-4.*

Zechner, Klaus, Higgins, Derrick, Xi, Xiaoming, Williamson, David; Automatic Scoring of Non-Native Spontaneous Speech in Tests of Spoken English; Speech Communication, 51(10); 2009.*

Zechner, Klaus, Higgins, Derrick, Xi, Xiaoming; SpeechRater: A Construct-Driven Approach to Scoring Spontaneous Non-Native Speech; In Proc. SLATE; 2007.*

Stouten, F.; Martens, J.P.;, "A feature-based filled pause detection system for Dutch," Automatic Speech Recognition and Understanding, 2003. ASRU '03. 2003 IEEE Workshop on, vol., no., pp. 309-314, Nov. 30-Dec. 3, 2003.*

Xi, Xiaoming, Higgins, Derrick, Zechner, Klaus, Williamson, David; Automated Scoring of Spontaneous Speech Using SpeechRater (SM)v 1.0; Education and Testing Service, Research Report RR-08-62; Princeton, N J; 2008.*

Towell., "Relative degrees of fluency." International Review of Applied Linguistics. Jun. 4, 2002, vol. 40, No. 2, pp. 117-150.*

* cited by examiner

400

AUTOMATIC EVALUATION OF SPOKEN FLUENCY

BACKGROUND

1. Field of the Invention

The present invention relates to linguistics equipment and systems, and more specifically, to systems, methods and computer products for evaluating the fluency of a person speaking a language other than the person's native tongue.

2. Description of Related Art

Fluency evaluation can be used to assess the competence and effectiveness of people whose jobs depend on spoken communications, for example, call center agents, sales associates, technical representatives, or others who converse with the public as part of their job. Conventional methods of fluency evaluation typically analyze the speaking style of a person to detect the types and frequency of filler-words and discourse-markers used by the person. The results of the fluency evaluation may then be used to provide appropriate feedback to the person—e.g., the call center agent—to improve the person's job performance. Automatic fluency evaluation can also be used to evaluate the speaking skills of students learning a second language. Learning the disfluency patterns can also aid in improving the speech patterns of automatic Text-To-Speech (TTS) systems, making them sound less mechanical and more like natural spoken conversation.

Previous work done in this area focused on detecting disfluencies in the speech recognition transcripts, and removing the disfluent text to make the speech transcripts more readable and/or easier to use for further natural language processing. Earlier techniques for spoken fluency evaluation do not capture the various dimensions of disfluencies.

Various embodiments of the invention address the shortcomings of conventional systems by automatically evaluating a person's spoken fluency and providing a score that quantifies the fluency of the speaker.

SUMMARY

Embodiments disclosed herein address the above stated needs by providing systems and methods for computing a numeric fluency score by analyzing the prosodic and lexical features. This is done by either recording a live spoken session of the speaker, or by prompting the speaker to talk on a given topic and recording the speaker's speech to get a recorded sample of speech. The patterns of disfluencies in the speech are then analyzed to compute a numerical score to quantify the spoken fluency skills of the speakers. The numerical fluency score accounts for various prosodic and lexical features, including formant-based filled-pause detection, closely-occurring exact and inexact repeat N-grams, normalized average distance between consecutive occurrences of N-grams.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1:
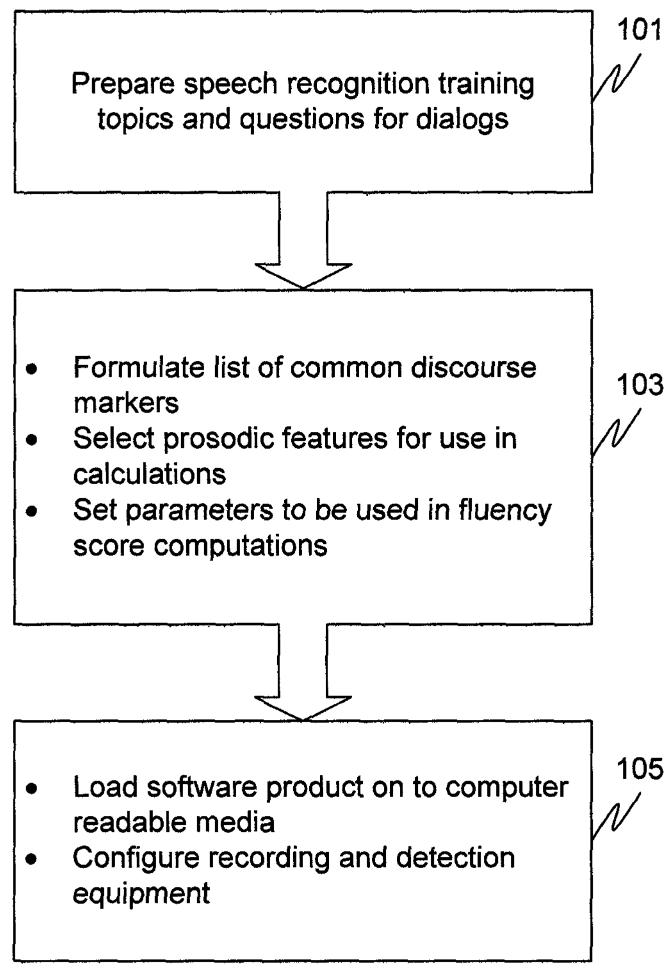
FIG. 1 depicts a method of preliminary activities for preparing the spoken fluency evaluation system.

FIG. 1 depicts a number of preliminary activities for preparing the spoken fluency evaluation system. Part of the process involves gathering a speech sample from the person to be evaluated. This can be done in several different manners, for example, by having the person speak, ad hoc, on a given topic, or by engaging the person in a conversation, or by recording a live conversation of the person. The activities of block 101 involve creating topics for the person to speak on. Such topics may include asking the person to speak about their favorite movie, their favorite book, asking them to discuss their job duties, asking the person to describe the college or high school he/she attended, or other such topics familiar to the person. Having the person speak about a topic that the person is relatively knowledgeable about allows the person's fluency to be gauged without hesitation caused by uncertainty about the topic itself. In other embodiments the speech sample may be gathered by asking the person a series of questions, and recording the person's answers as a speech sample. For this embodiment, block 101 involves preparation of a series of questions to ask the person about various topics so as to steer the conversation of the person in a particular direction following the questions. Once the speech recognition training topics and dialog questions have been prepared in 101 the method proceeds to block 103.

Before beginning the process of evaluating speakers the various parameters to be used by the system should be initially set up. This is done in block 103. For example, any spoken language will have a number of common discourse markers used by weak speakers, such as "you know," "basically," "I mean," and so on. In addition, there may be industry specific discourse markers or discourse markers commonly used in a particular technical context or given geographic region. One of the activities of block 103 involves listing the discourse markers that are likely to be encountered in the speech samples. This list may be used in the process of hypothesizing discourse markers in a speech sample. Also note that new and/or speaker-specific discourse markers can be learned dynamically by detecting words that occur very frequently in the speaker's speech. Block 103 also entails specifying the various prosodic features to be used in calculating fluency, and setting the parameters of the fluency calculations (e.g., parameter selection, weighting functions for the parameters). Another activity that may be performed 103 is the setting up of the energy level thresholds that define silence during the speech sample. This may entail defining the threshold between speech and silence for the energy-based Voice Activity Detector (VAD), the device used to distinguish between speech and silence in a recorded speech sample. This threshold can also be learned from the initial few milliseconds of the audio (which is presumed to be a non-speech region). The activities of blocks 101 and 103 generally involve deciding upon and setting up the logic and parameters to be used in gathering and analyzing the speech sample data.

Block 105 involves configuring the speech recorders or other data gathering system and the computer system or other computational device. Typically, this entails loading one or more software programs onto a computer system and setting up sound recording equipment. The data may be gathered either using audio inputs to the computer system, or by using specialized recording instruments and saving the data which is then provided to the computer system. The computer system may be any type commonly used by those of ordinary skill in the art. A typical computer system for practicing the invention is discussed in further detail in conjunction with FIG. 4.

Figure 2:
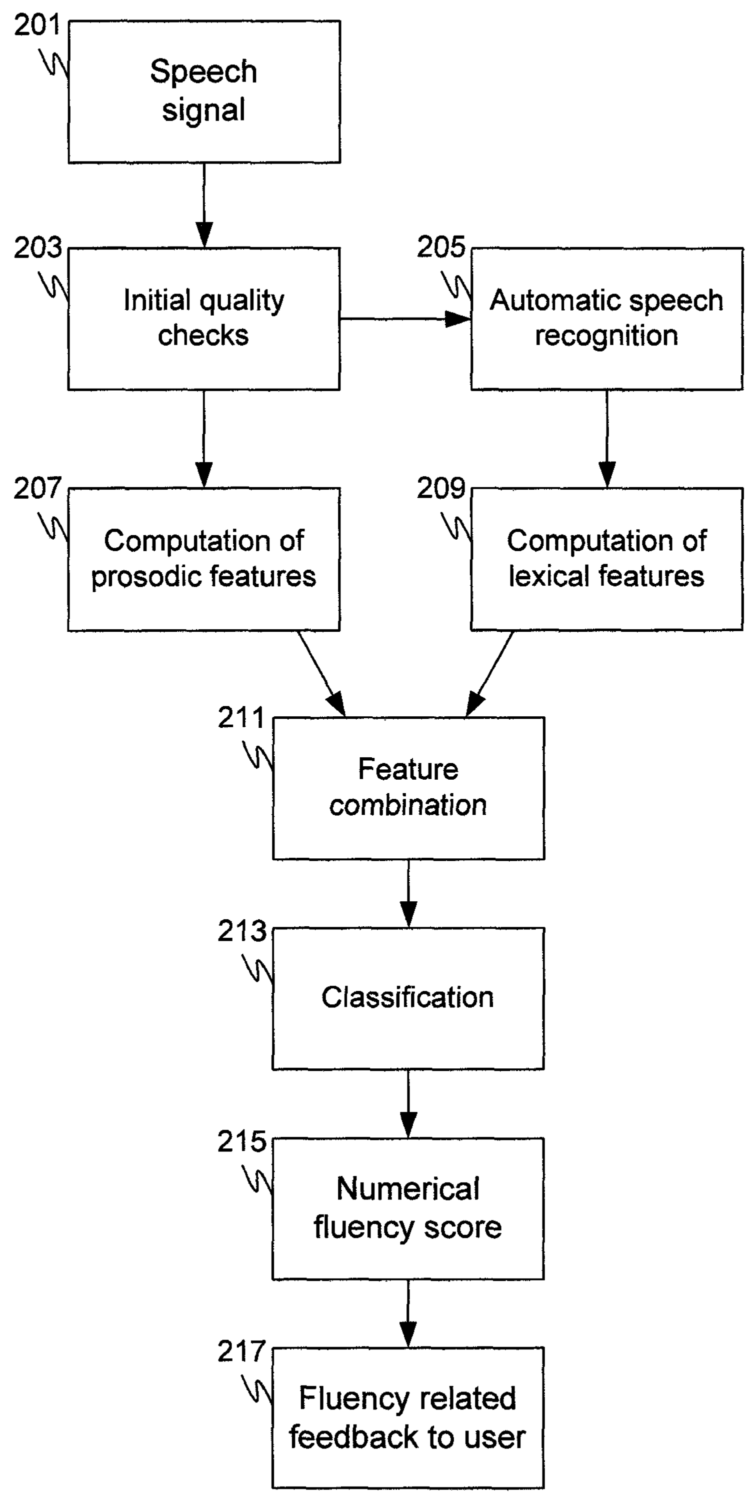
FIG. 2 depicts an overview of the spoken fluency evaluation scheme.

FIG. 2 depicts an overview of the spoken fluency evaluation scheme according to various embodiments. Block 201 represents a speaker's recorded speech sample to be used in evaluating the speaker's fluency. In some scenarios the speaker is asked to talk about a preselected topic (e.g., favorite movie, favorite book, home-town and so on) and his/her fluency is evaluated on the basis of this speech sample.

In other scenarios, the speaker is presented with a sequence of topics such that the topics occurring later in the sequence depend on and are less familiar than the topics occurring early on in the sequence. For example, a sequence could include following three topics: (a) talk about yourself and your hobbies, (b) talk about the most recent book you read (if the hobbies included 'reading'), and (c) talk about the favorite character of the book. Note that, of the three topics, the speaker would be most familiar and hence most fluent on the topic listed in (a). Topic in (b) depends on the speaker's response to topic in (a) and is in general less familiar to the topic in (a). Similarly, topic in (c) depends on the response to topic in (b) and is more extempore than the topic in (b). Such gradual transition from "comfort-zone" topics to extempore topics can help in performing finer analysis of the speaker's fluency skills.

In some other scenarios, an actual conversation of the person can be monitored and analyzed. For example, a phone conversation of a call center agent interacting with a customer can be analyzed to evaluate the agent's spoken fluency. The speech sample may be recorded in analog or a digital format, depending upon the particularities of the system being used to gather the sample. At some point any analog recording must be digitized to facilitate speech signal processing of the speech sample. The sample may be stored on any of several types of computer readable media that are readily available, including for example, a computer hard disk drive, removable storage disks, or any other such type of optical or magnetic media commonly used for data storage.

Once the speech sample has been collected, the speech signals 201 of the speaker are subjected to initial quality checks 203. The initial quality checks are done to ensure that the speech data is indeed collected. For example, a check may be made to verify that the microphone is on and in working condition. Another initial quality check that is often made is to verify that the speech being detected is in machine-usable format. For example, the system may verify that the dynamic range of the speech signal is not too small not too high. Upon passing an initial amount of quality processing, data from the signals are passed to both an automatic speech recognition (ASR) module 205 and to a module for computation of prosodic features of the speech 207. Analysis and detection of lexical features is done after the sample is passed through the ASR. On the other hand, the system can analyze prosodic features based on the sample itself-without need for ASR speech recognition. Therefore, the computation of lexical features (step 209) and prosodic features (step 207) may be done independent of each other, for example, at the same time or one after the other in any order.

After the automatic speech recognition 205 the method proceeds to block 209 where the system computes lexical features 209. Independent of this, the prosodic features are computed in step 207. The results of 207 and 209 are combined in block 211. Then classification is performed in module 213. This, in turn, results in a numerical fluency score 215. Finally, in block 217 a detailed feedback in terms of the fluency-related errors is provided to the user. Further details of the various processing activities are discussed in the ensuing paragraphs describing FIG. 3.

Figure 3:
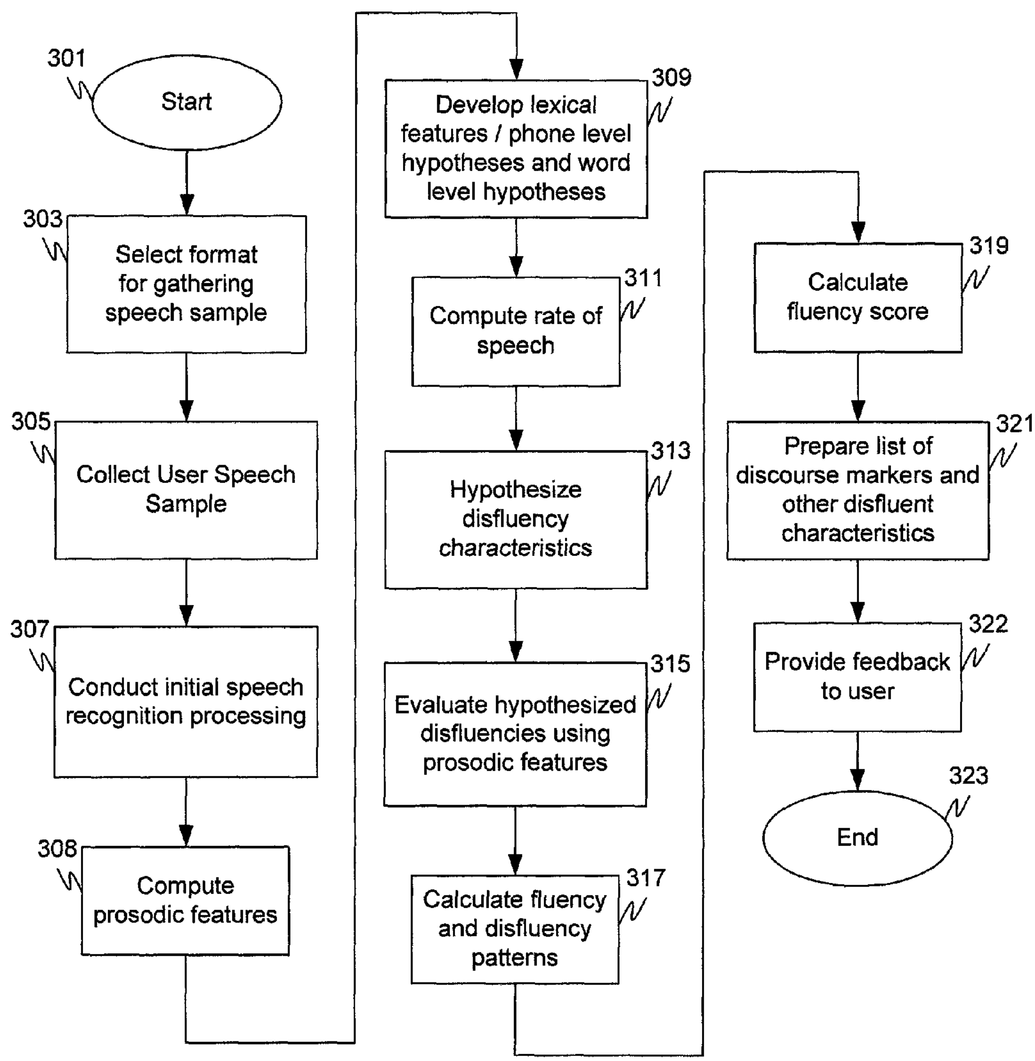
FIG. 3 depicts a method of computing a numeric fluency score by analyzing the prosodic and lexical features.

FIG. 3 depicts a method of computing a numeric fluency score by analyzing the prosodic and lexical features. The method begins in block 301 and proceeds to 303 to select a format for gathering a sample of speech from the speaker. In some embodiments the speaker may be asked to speak on a given topic, while in other embodiments the speaker may be engaged in conversation with an interviewer helping to collect the speech sample. In yet other embodiments the speaker may be recorded during a live, unscripted conversation with another person (e.g., recording a received sales call or technical help call). Typically, regardless of the format, the speaker is asked to speak about a topic with which the speaker is familiar in order to gauge the speaker's fluency without verbal errors introduced because of uncertainty about the topic itself. Such topics may include asking the person to speak about their favorite movie, their favorite book, asking them to discuss their job duties, asking the person to describe the college or high school he/she attended, or other like topics. In some other embodiments, the speaker may be presented with a sequence of topics such that the topics occurring later in the sequence depend on and are less familiar than the topics occurring early on in the sequence.

Once the format and topic are selected in block 303 the method proceeds to 305 to collect the speech sample from the user. The sample may be collected by recording the speaker using a number of different types of equipment. The speaker may speak into a microphone suitable for recording voice or other audio. Typically, the speaker is asked to talk on the pre-selected topic for about a minute, although the recording may be for a longer or shorter duration. The sample may either be digitally recorded, or recorded in an analog format and converted to digital data for speech signal processing. The voice sample may be stored within a computer system, or any other type of storage media suitable for storing voice or other audio. If the speaker's job involves talking on the telephone the recording may be done via telephone to emulate the speaker's work environment. However, speech transmitted via telephone lines tends to be degraded by the bandwidth of the telephone system and quality of telephone components. If a telephone recording is made it is preferable that the communication link be of known quality and transmission characteristics so as to be able to distinguish between line noise and the speaker's voice characteristics. The sampling itself may involve recording one speech sample, or several different samples to get a fair representation of the speaker's fluency capabilities. Once the speech sample has been collected in 305 the method proceeds to 307.

In block 307 the recording is passed through a standard Automatic Speech Recognition (ASR) system to obtain multiple phone-level and word-level hypotheses, the corresponding phone and word confidence scores and the time alignments. If the speech sample is not yet in digital form the first step is to digitize it. The sampling rate is typically in the range of 8,000 to 22,500 samples per second, however, any sampling rate known to those of ordinary skill in the art may be used, depending upon the parameters of the implementation and equipment being used. Once the initial speech recognition processing is complete in 307 the method proceeds to 309. In block 309 the prosodic features of the speech sample are calculated. The prosodic features of interest generally include filled-pause and amount of silence based features. The filled-pauses features may be detected using measures based on the stability of the formants of the speech signal. The ASR may be used in computing the features representing the spectral domain content of speech, that is, the regions of strong energy for speech frequencies. These features are computed in lengths of time called frames, e.g., 10-msec length sections. Once the ASR processing is complete the system can begin analyzing the transcript for lexical features. Prosodic features may be computed directly on the physical speech signal, however lexical features require the transcripts of the recorded speech signal, e.g., as obtained by an ASR system. Upon completing in 309 the method proceeds to 311.

Block 311 involves developing lexical features from the speech sample, for example, the phone level hypotheses and word level hypotheses. The ASR system may use a neural network to classify features into phonetic-based categories at each frame. Typically, ASR involves performing a Viterbi search to match the neural network output scores to target words assumed to be in the input speech in order to determine the word that was most likely uttered. The multiple hypotheses may be represented compactly in a lattice structure. The lattice, in turn, may be used to compute per-word and per-unit-time rate of filled-pauses and other disfluency indicators. The relative frequency of various words is computed to find out speaker-specific discourse-markers (e.g., "you know," "basically," "I mean" and so on).

Lexical features are computed from the transcripts returned by the ASK system. The basic lexical features are the occurrence frequencies of various N-grams. A disfluent speaker typically tends to use redundant language in which the same set of words is spoken over and over again. Thus, the count of the most common N-grams in the utterance is typically higher for a disfluent speaker than for a fluent speaker. The "Repetition" form of disfluency can be located by detecting instances of closely occurring N-grams, that is, the closely-occurring exact and inexact repeat N-grams. An N-gram is said to be closely-occurring if the distance between consecutive occurrences of a N-gram is less than W words, where W is a predefined variable. The optimal value of the variable W can be learned from training data or other empirical results. A typical range for the variable W is 1 to 5 words although it could be different for different training datasets or domains.

One use of the variable W is to account for the typical word length of editing terms. For example, in "I am, ahh you know, I am planning to work till late today," "ahh you know" is the editing term which is three words long. To capture disfluencies those include inexact repetitions, two N-grams (trigram and above) are said to match if they differ only by one word. For example, in "My father is, ahh, my father ahh is," the trigram "my father is" is said to have two instances as there is only one extra word ("ahh") inserted in the second instance. We have found that the total count, or per unit rate, of closely occurring (with exact as well as inexact repeat) N-grams is a good indicator of the disfluency level of a speaker. Typical data normalization techniques like stemming and/or removal of stop words can be used before computing the occurrences of repetitions of various exact and inexact N-grams. One more lexical feature is based on the normalized distance between consecutive occurrences of N-grams in a speaker's recording. The normalization is done by computing the average distance (called the global average distance) between consecutive occurrences of various N-grams over a larger text database consisting of transcriptions of recordings of speakers with various levels of spoken fluency skills. The global average distance takes into consideration the structure of the language and the frequency of occurrence of various N-grams in normal usage. On the transcripts of a disfluent speaker's recording, the normalized distance will be much lower than the corresponding global average distance for many N-grams whereas the normalized distance will be very close to or more than the corresponding global average distance in the case of a fluent speaker.

Upon completing 311 the method proceeds to 313 to compute the rate of speech for the speaker. Once the ASR processing is complete the rate of speech can be determined. The rate of speech calculation is based on transcript of lexical features resulting from the ASR processing. The duration of the phones may be used to compute rate of speech. Once rate of speech has been determined the method proceeds to 313.

Block 315 involves hypothesizing the disfluency characteristics from the speaker's speech sample. Some of the examples of disfluency characteristics are: (a) unnaturally long and/or frequent silent pauses (i.e., silences) in the speech signal, (b) insertions of filled-pauses like "ahh", "umm" and/or vowel-extensions like "theee", (c) frequent use of a word/phrase during the speaker's turn (e.g., "basically", "you know"), (d) frequent and closely occurring repetitions of exact and/or in-exact N-grams, and (e) a combination of two or more of the above characteristics. Previous work done in this area focused on detecting disfluencies based solely on the speech recognition transcripts, and then removing the disfluent text to make the speech transcripts more readable and/or easier to use for further natural language processing. Other conventional approaches that compute a score of the spoken fluency skills of a speaker overlook the various characteristics of the speech that contribute to disfluency. For example, if a speaker repeats the same sentence or same concept several times in grammatically complete and correct sentences, the previous techniques will not recognize the speaker as disfluent even though he/she should, in reality, receive a very low fluency score. The various embodiments disclosed herein detect these repetitions and penalize the speaker appropriately. In this way the various embodiments analyze the disfluency patterns of the speaker and provide feedback so the speaker can improve his/her spoken fluency. The embodiments can be used to assess and improve the spoken fluency skills of employees in the area of customer care and hospitality. It can be used to evaluate the speaking skills of students learning English as a second language and to provide feedback on how these skills can be improved.

Regions with disfluency often consist of three segments as shown below:

. . . [reparandum]*[editing term] [correction] . . .

For example: [I am]*[aah, you know] [we are] leaving today. The "reparandum" is the part of the speech that will be replaced later. The end of the reparandum is typically referred to as the "interruption point." (The interruption point is marked as "*" in the example above). The "editing term" is the part between the reparandum and the beginning of the "correction." The editing term is typically used by the speakers to stall for time while they are formulating their thoughts. The "correction"—sometimes referred to as "repair" or "alteration"—is the region that the speaker wants to use in place of the reparandum. Removing the reparandum and the editing term restores structural fluency in the utterance.

In the simplest form of disfluency, the reparandum is empty and the editing term consists of a silent-pause, a filled-pause or a discourse marker. Silent pauses in spontaneous speech, although important for natural conversation, can sometimes be an indicator of disfluency. Some speakers will simply pause—a silent pause—while searching (considering) the right words to complete a sentence or while forming the next thought. Filled-pauses are generally more common than silent pauses. Speakers generally tend to use filled-pauses while speaking, either due to hesitation or to allow themselves time to think or frame the next part of the conversation. Common examples of filled-pauses include "uh," "umm," and "aah." Another filled pause occurs when the speaker extends the vowels in a word (e.g., "theeee"—that is, extending "the" to sound like "thuuuuh"). Various embodiments disclosed herein rely on a novel formant-based filled-pause detection that is based on the observation that the shape of the vocal tract and hence the characteristics of the speech production filter vary very little over the duration of the filled-pause or that of the extended vowels. This results in minimal temporal variations in the resonances of the filter which are also called the formants. In fluent voiced speech regions the formants vary widely as the vocal tract shape changes rapidly. Co-articulation, which is present in fluent speech, also plays an important role in the fluctuation of formant values. The formant-based filled-pause detection is more robust than existing methods. Our experiments corroborate this claim. Filled-pause based features include average durations of filled-pauses, average distance between consecutive filled-pauses, duration of the longest filled-pause in the utterance and number of filled-pauses per unit time.

The duration based prosodic features used in the various embodiments include the relative durations of contiguous speech and contiguous silence regions in the recordings. The speech vs. silence distinction may be made using an energy-based Voice Activity Detector (VAD). Conventional VAD techniques classify filled-pauses as speech regions. The locations of filled-pauses detected using formant-based calculations are used to re-classify these regions as silence and re-compute the relative duration-based prosodic features.

Other forms of disfluency in addition to filled pauses include discourse markers, repetition, false start and insertion. Discourse markers are words and phrases typically used by speakers to either allow themselves time while maintaining their speaking turn or to abruptly end their previous statement and restart or to interrupt and change the previous statement. Common examples of discourse-markers include: "I mean," "you know," "basically," and "actually." Repetition is another form of disfluency (e.g., I I am going). False start and insertion are two other similar forms of disfluency. False start occurs when the speaker starts over, replacing one or more incorrect words in the second attempt at a sentence (e.g., I am/We are leaving today). Insertion is similar to false start, except the same phrase is spoken with a new word being inserted (e.g., I am leaving/I am surely leaving today). Once the hypothesizing of disfluency characteristics has been completed in 315 the method proceeds to 317.

In block 317 prosodic features are used to evaluate hypothesized disfluency characteristics. For example, prosodic features may be used to disambiguate whether a likely discourse marker or other disfluency characteristic is a contributing part of the sentence, or simply contributes to disfluency. Consider the common discourse marker "you know." In most, but not all, instances this phrase indicates a disfluency. But in a sentence like "You know very well where I was yesterday," the words "you know" are part of the fluent sentence. Absence or presence of prosody-based filled-pause(s) in the vicinity of "you know" can help in deciding whether the "you know" is more likely to be part of fluent sentence or a disfluency, respectively. It may sometimes be the case that words thought to be a discourse marker are instead a contributing part of the sentence. Various other prosodic features based on relative duration of speech and silence may also be used to rate the fluency of the speaker. A statistical classifier is trained using these features to compute a fluency score for each of the recording.

Upon completing 317 the method proceeds to 319 to calculate fluency and disfluency patterns. Each person's speaking ability is characterized by patterns and habits of grammar, vocabulary and phrasing. Some patterns are correct, contributing to the person's fluency, while other patterns are incorrect resulting in disfluencies in the person's speaking abilities. Calculating the speaker's fluency and disfluency patterns allows bad habits to be identified—the first step in correcting the person's disfluencies and improving the person's speaking ability. Once the speaker's fluency and disfluency patterns have been determined in 319 the method proceeds to 321.

In block 321 a fluency score is calculated for the speaker based on the various disfluencies and characteristics determined from the recorded speech sample. The fluency score serves as a simple guideline for evaluating the fluency of an individual. It may be used for various purposes, including for example, to gauge the speaker's progress in mastering a new language, in the evaluation process of an employee, to help the speaker improve his/her language skills, to help make a decision in the hiring process, or other such purposes relating to one's mastery of spoken language skills.

In accordance with various different embodiments the formula for specifying a fluency score may be altered depending upon the goals of the implementation. For example, the lexical features and prosodic features determined from the speech sample may be combined in various ways before being used to classify the speaker's fluency skills. One simple combination occurs when concatenating all the features to form one N-dimensional feature vector. Hierarchical combinations where certain regions of interest are identified from either the prosodic or the lexical features and the other set of features is used to analyze these regions of interest are also proposed. A statistical classifier can be trained on the combination of these features to learn the pattern of the features in disfluent versus fluent speakers. The ground truth is obtained from human experts. In the present work, human experts assign numeric scores ranging from 1 (highly disfluent) to 4 (very fluent). Thus, the classifier is a 4-class classifier. For a test utterance, the prosodic and lexical features mentioned above are computed and passed to the classifier. The classifier returns a fluency score between 1 and 4. The proposed technique can also be easily modified to develop a C-class classifier for a reasonable value of C. The proposed fluency evaluation technique can also point out the kind of disfluencies the speaker tends to use and suggest ways to improve his/her fluency skills.

Once the fluency score has been calculated in 321 the method proceeds to 323 to prepare a list of the various discourse markers and other disfluent characteristics determined in the speech sample of the speaker. Typically, the list provides an indication of the frequency of occurrence of the various discourse markers and other disfluent characteristics. This serves as feedback to the speaker for improving his/her fluency, and may be useful in providing specific suggestions of areas needing modification. In addition, the list may be stored and compared to other, similar lists generated over time to gauge the speaker's progress in becoming more fluent.

Once the list has been completed in 323 the method proceeds 325 to provide feedback to the user, or in some implementations, directly to the speaker being evaluated. Part of this may entail providing the list prepared in 323 to the user running the test. The feedback may be formatted to display the speaker's detrimental language characteristics in the order in which they contribute towards the speaker's disfluency. That is, the feedback may be ranked, showing the speaker's worst habits first all the down the list to minor habits that do not affect disfluency as much. The feedback may also include suggestions for key areas to work on for improvement, and suggestions for changes to adopt to overcome particular issues contributing to the speaker's disfluency. Upon completing the feedback for the user in 325 the method proceeds to 327 and ends.

Figure 4:
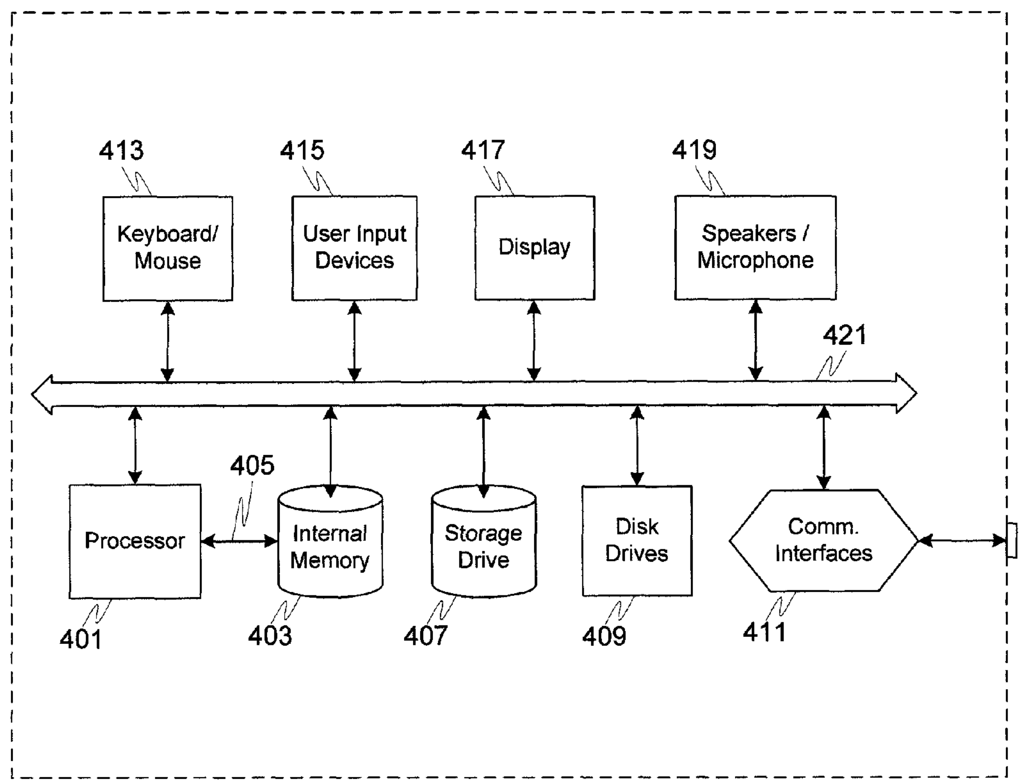
FIG. 4 depicts a computer system suitable for implementing and practicing various embodiments.

FIG. 4 depicts a computer system 400 suitable for implementing and practicing various embodiments. The computer system 400 may be configured in the form of a desktop computer, a laptop computer, a mainframe computer, or any other arrangement capable of being programmed or configured to carry out instructions. The computer system 400 may be located and interconnected in one location, or may be distributed in various locations and interconnected via communication links such as a local or wide area network (LAN or WAN), via the Internet, via the public switched telephone network (PSTN), or other such communication links. Other devices may also be suitable for implementing or practicing the embodiments, or a portion of the embodiments. Such devices include personal digital assistants (PDA), wireless handsets (e.g., a cellular telephone or pager), and other such consumer electronic devices preferably capable of being programmed to carry out instructions or routines.

Typically, a computer system 400 includes a processor 401 which may be embodied as a microprocessor or central processing unit (CPU). The processor 401 is configured to access an internal memory 403, generally via a bus such as the system bus 421. The internal memory 403 may include one or more of random access memory (RAM), read-only memory (ROM), cache memory, or a combination of these or other like types of circuitry configured to store information in a retrievable format. In some implementations the internal memory 403 may be configured as part of the processor 401, or alternatively, may be configured separate from it but within the same packaging. The processor 411 may be able to access internal memory 403 via a different bus or control lines (e.g., local bus 405) than is used to access the other components of computer system 400.

The computer system 400 also includes, or has access to, one or more storage drives 407 (or other types of storage memory) and floppy disk drives 409. Storage drives 407 and the floppy disks for floppy disk drives 409 are examples of machine readable (also called computer readable) mediums suitable for storing the final or interim results of the various embodiments. The floppy disk drives 409 may include a combination of several disc drives of various formats that can read and/or write to removable storage media (e.g., CD-R, CD-RW, DVD, DVD-R, floppy disk, etc.). The computer system 400 may either include the storage drives 407 and floppy disk drives 409 as part of its architecture (e.g., within the same cabinet or enclosure and/or using the same power supply), as connected peripherals, or may access the storage drives 407 and floppy disk drives 409 over a network, or a combination of these. The storage drive 407 is often a hard disk drive configured for the storage and retrieval of data, computer programs or other information. The storage drive 407 need not necessarily be contained within the computer system 400. For example, in some embodiments the storage drive 407 may be server storage space within a network that is accessible to the computer system 400 for the storage and retrieval of data, computer programs or other information. In some instances the computer system 400 may use storage space at a server storage farm, or like type of storage facility, that is accessible by the Internet 450 or other communications lines. The storage drive 407 is often used to store the software, instructions and programs executed by the computer system 400, including for example, all or parts of the computer application program for carrying out various embodiments of the invention.

The computer system 400 may include communication interfaces 411 configured to be communicatively connected to the Internet a local area network (LAN), a wide area network (WAN), or connect with other devices using protocols such as the Universal Serial Bus (USB), the High Performance Serial Bus IEEE-1394 and/or the high speed serial port (RS-232). The computers system 400 may be connected to the Internet via the wireless router 401, or a wired router or other such access node (not show). The components of computer system 400 may be interconnected by a bus 421 and/or may include expansion slots conforming to any of various industry standards such as PCI (Peripheral Component Interconnect), ISA (Industry Standard Architecture), or EISA (enhanced ISA).

Typically, the computer system 400 includes one or more user input/output devices such as a keyboard and/or mouse 413, or other means of controlling the cursor represented by the user input devices 415 (e.g., touchscreen, touchpad, joystick, trackball, etc.). The communication interfaces 411, keyboard and mouse 413 and user input devices 415 may be used in various combinations, or separately, as means for receiving information and other inputs to be used in carrying out various programs and calculations. A display 417 is also generally included as part of the computer system 400. The display may be any of several types of displays, including a liquid crystal display (LCD), a cathode ray tube (CRT) monitor, a thin film transistor (TFT) array, or other type of display suitable for displaying information for the user. The display 417 may include one or more light emitting diode (LED) indicator lights, or other such display devices. In addition, most computer systems 400 also include, or are connected to, one or more speakers and microphones 419 for audio output and input. Speech recognition software may be used in conjunction with the microphones 419 to receive and interpret user speech commands.

Various activities may be included or excluded as described above, or performed in a different order, while still remaining within the scope of at least one of the various embodiments. For example, rate of speech (block 313) may be calculated at any point in the process after the lexical features have been determined (block 311). Other steps or activities of the methods disclosed herein may be omitted or performed in a different manner while remaining within the intended scope of the invention. The method may be implemented through the addition and manipulation of circuitry to a design, hence is applicable for analysis using logic evaluation frameworks such as logic simulators or formal verification algorithms, as well as hardware-based frameworks such as hardware emulators/accelerators and even fabricated chips.

The invention may be implemented with any sort of processing units, processors and controllers (e.g., processor 401 of FIG. 4) capable of performing the stated functions and activities. For example, the processor 401 may be embodied as a microprocessor, microcontroller, DSP, RISC processor, or any other type of processor that one of ordinary skill would recognize as being capable of performing the functions described herein. A processing unit in accordance with at least one of the various embodiments can operate computer software programs stored (embodied) on computer-readable medium such as the disk drives 409, the storage drive 407 or any other type of hard disk drive, CD, flash memory, ram, or other computer readable medium as recognized by those of ordinary skill in the art.

The computer software programs can aid or perform the steps and activities described above. For example computer programs in accordance with at least one of the various embodiments may include: source code for recording a sample of speech by the speaker; source code for hypothesizing disfluencies in the speech to develop a list of hypothesized disfluency characteristics; source code for analyzing patterns of the hypothesized disfluency characteristics in the speech; source code for detecting closely-occurring exact and inexact repeat N-grams; and source code for computing a numerical fluency score to quantify the spoken fluency skills of the speaker. There are many further source codes that may be written to perform the various steps, activities and procedures disclosed above that are intended to lie within the scope of the various embodiments.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A method of evaluating spoken fluency of a speaker, comprising:

capture a speech sample of the speaker;

process the speech sample to compute prosodic features related to fluency evaluation;

convert the speech sample to text using an automatic speech recognizer;

compute lexical features from an output of the automatic speech recognizer; and combine the lexical features and the prosodic features to classify the speaker and develop a rating for the speaker;

wherein the capturing of the speech sample comprises prompting the speaker to speak on a first topic, prompting the speaker to speak on a second topic, and prompting the speaker to speak on a third topic; and wherein the first topic is more familiar to the speaker than the second and third topics, and the second topic is more familiar to the speaker than the third topic.

2. The method of claim 1, wherein the combining of the lexical features and the prosodic features further comprises:

perform a C-class classification to classify the speaker.

3. The method of claim 1, wherein the prosodic features include filled-pause features and amount of silence based features.

4. The method of claim 3, wherein the filled-pauses features are detected using measures based on stability of the formants of the speech signal.

5. The method of claim 1, wherein the lexical features include features selected from a group consisting of a count of total word repetitions, a count of closely repeated exact and inexact N-grams, and a normalized average distance between consecutive occurrences of N-grams.

6. The method of claim 1, wherein the combination of lexical and prosodic features is hierarchical, the method further comprising:

using the prosodic features to either validate or invalidate a disfluency hypothesis made by the lexical features, or using the lexical features to either validate or invalidate a disfluency hypothesis made by the prosodic features.

7. The method of claim 1, further comprising:

detecting and identifying different disfluency characteristics present in the speech sample.

8. The method of claim 7, further comprising:

provide feedback including a list of the different disfluency characteristics and an indication of a relative proportion of the different disfluency characteristics.

9. The method of claim 7, further comprising:

provide feedback including an indication of locations of the different disfluency characteristics within the speech sample, and an indication of a type of disfluency characteristic at each of said locations.

10. A software product comprising a program of instructions stored on a machine readable device for evaluating spoken fluency of a speaker, wherein the program of instructions upon being executed on a computer causes the computer to perform activities comprising: capturing a speech sample of the speaker;

processing the speech sample to compute prosodic features related to fluency evaluation;

converting the speech sample to text using an automatic speech recognizer;

computing lexical features from an output of the automatic speech recognizer; and combining the lexical features and the prosodic features to classify the speaker and develop a rating for the speaker;

wherein the capturing of the speech sample comprises prompting the speaker to speak on a first topic, prompting the speaker to speak on a second topic, and prompting the speaker to speak on a third topic; and wherein the first topic is more familiar to the speaker than the second and third topics, and the second topic is more familiar to the speaker than the third topic.

11. The software product of claim 10, wherein the combining of the lexical features and the prosodic features further comprises:

perform a C-class classification to classify the speaker.

12. The software product of claim 10, wherein the prosodic features include filled-pause features and amount of silence based features; and wherein the filled-pauses features are detected using measures based on stability of the formants of the speech signal.

13. The software product of claim 10, wherein the lexical features include features selected from a group consisting of a count of total word repetitions, a count of closely repeated exact and inexact N-grams, and a normalized average distance between consecutive occurrences of N-grams.

14. The software product of claim 10, wherein the combination of lexical and prosodic features is hierarchical, the activities further comprising:

using the prosodic features to either validate or invalidate a disfluency hypothesis made by the lexical features, or using the lexical features to either validate or invalidate a disfluency hypothesis made by the prosodic features.

15. The software product of claim 10, further comprising:

detecting and identifying different disfluency characteristics present in the speech sample.

16. The software product of claim 15, further comprising:

provide feedback including a list of the different disfluency characteristics and an indication of a relative proportion of the different disfluency characteristics; wherein said feedback includes an indication of locations of the different disfluency characteristics within the speech sample, and an indication of a type of disfluency characteristic at each of said locations.

17. The software product of claim 10, wherein the first topic comprises asking the speaker questions and recording the speaker's answers to the questions to include in the sample, and wherein the second and third topics are selected based on content from the speaker's answers that indicates a familiarity with one or more topics.

18. A system configured to evaluate spoken fluency of a speaker, the system comprising:

a recording device configured to capture a speech sample of the speaker;

a processor configured to process the speech sample to compute prosodic features related to fluency evaluation;

an automatic speech recognition module configured to convert the speech sample to text;

a memory configured to store instructions for computing lexical features from an output of the automatic speech recognizer; and a display device configured to display feedback created by combining the lexical features and the prosodic features to classify the speaker and develop a rating for the speaker;

wherein the capturing of the speech sample by the recording device comprises prompting the speaker to speak on a first topic, prompting the speaker to speak on a second topic, and prompting the speaker to speak on a third topic; and wherein the first topic is more familiar to the speaker than the second and third topics, and the second topic is more familiar to the speaker than the third topic.

19. The method of claim 1, wherein the first topic comprises asking the speaker questions and recording the speaker's answers to the questions to include in the sample, and wherein the second and third topics are selected based on content from the speaker's answers that indicates a familiarity with one or more topics.

20. The system of claim 18, wherein the first topic comprises asking the speaker questions and recording the speaker's answers to the questions to include in the sample, and wherein the second and third topics are selected based on content from the speaker's answers that indicates a familiarity with one or more topics.

* * * * *